United States Patent
Itkin et al.

(10) Patent No.: US 12,373,293 B1
(45) Date of Patent: Jul. 29, 2025

(54) EFFICIENT DEVICE RECOVERY

(71) Applicant: MELLANOX TECHNOLOGIES, LTD., Yokneam (IL)

(72) Inventors: Yuval Itkin, Zoran (IL); Ahmad Atamli, Brighton (GB); Nadir Muhammad Khan, San Jose, CA (US); Edward L. Riegelsberger, Fremont, CA (US); Varun Sampath, Santa Clara, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 6 days.

(21) Appl. No.: 18/426,096

(22) Filed: Jan. 29, 2024

(51) Int. Cl.
| | |
|---|---|
| *G06F 11/00* | (2006.01) |
| *G06F 11/07* | (2006.01) |
| *G06F 11/14* | (2006.01) |
| *G06F 13/40* | (2006.01) |

(52) U.S. Cl.
CPC ...... *G06F 11/1415* (2013.01); *G06F 11/0745* (2013.01); *G06F 11/0793* (2013.01); *G06F 13/4027* (2013.01); *G06F 2201/805* (2013.01)

(58) Field of Classification Search
CPC ............. G06F 11/0745; G06F 11/0793; G06F 11/1415
See application file for complete search history.

(56) References Cited

U.S. PATENT DOCUMENTS

| | | | | |
|---|---|---|---|---|
| 10,754,722 | B1* | 8/2020 | Lin | G06F 11/0709 |
| 2007/0169088 | A1* | 7/2007 | Lambert | G06F 11/0709 |
| | | | | 717/168 |
| 2014/0122942 | A1* | 5/2014 | Vilela | G06F 11/0793 |
| | | | | 714/48 |
| 2015/0052381 | A1* | 2/2015 | Zhang | G06F 11/0757 |
| | | | | 714/4.3 |
| 2015/0215343 | A1* | 7/2015 | Itkin | H04L 41/344 |
| | | | | 709/217 |
| 2017/0123884 | A1* | 5/2017 | Lai | G06F 11/0721 |
| 2018/0288090 | A1* | 10/2018 | Olarig | H04L 63/1458 |
| 2021/0109832 | A1* | 4/2021 | Ladkani | G06F 11/076 |
| 2022/0091920 | A1* | 3/2022 | Fujisaki | G06F 11/0778 |
| 2023/0216607 | A1* | 7/2023 | Ladkani | H04L 1/0036 |
| | | | | 714/752 |
| 2024/0419776 | A1* | 12/2024 | Wu | G06F 9/4401 |
| 2025/0094651 | A1* | 3/2025 | Rathinasamy | G06F 21/88 |

* cited by examiner

Primary Examiner — Joshua P Lottich
(74) *Attorney, Agent, or Firm* — Sheridan Ross P.C.

(57) ABSTRACT

Embodiments of the present disclosure are directed to efficient processes for recovering a hardware device in a computing system. Generally speaking, embodiments of the present disclosure include a two-part device recovery process. In a first part of the two-part process, an initial firmware image can be provided to the recovery device over a first, slower communication bus of the computing system. This initial image can provide the core for the device to communicate using a second, faster communications by of the computing system. A second part of the two-part process can then take place utilizing the second, faster communication bus.

20 Claims, 5 Drawing Sheets

EFFICIENT DEVICE RECOVERY

FIELD OF THE DISCLOSURE

The present disclosure is generally directed to recovery of a device in a computing system and more particularly to an efficient two-part device recovery process.

BACKGROUND

Recovery of a hardware device in a computing system is a delicate process which requires minimal hardware functionality from one side and relying only on hardware and code in read-only memory while mandating security at the same time. To address this challenge, the Open Compute Project (OCP) has defined a specification which addresses the needs of both, using the System Management Bus (SMBus) of the computing system. However, relying on a slow bus makes the recovery flow of modern devices very long which creates a challenge in real deployments where customers are expecting any such process to last no more than a few minutes. Hence, there is a need in the art for more efficient recovery processes.

BRIEF SUMMARY

Embodiments of the present disclosure are directed to efficient processes for recovering a hardware device in a computing system. Generally speaking, embodiments of the present disclosure include a two-part device recovery process. In a first part of the two-part process, an initial firmware image can be provided to the recovery device over a first, slower and simpler communications bus of the computing system. This initial image can provide the core for the device to communicate using a second, faster and more complex communication interfaces of the computing system. A second part of the two-part process can then take place utilizing the second, faster communications bus.

According to one embodiment, a Baseboard Management Controller (BMC) can comprise a first communication interface which, when coupled with a first communications bus, provides for communication on the first communications bus utilizing a first communication protocol and a second communication interface which, when coupled with a second communications bus, provides for communication on the second communications bus utilizing a second communication protocol. The second communications bus can transfer data at a higher rate than the first communications bus. For example, the first communication interface can comprise a System Management Bus (SMBus) interface and the second communication interface can comprise for example, a Peripheral Component Interconnect express (PCIe) bus interface or a Universal Serial Bus (USB) bus interface. The second communication protocol can comprise, for example, a Management Component Transport Protocol (MCTP).

The BMC can further comprise a control circuit controlling operations of the BMC. Upon detecting startup of a device coupled with the first communication bus and the second communication bus, the control circuit of the BMC can cause the BMC to perform a two-part recovery process. A first part of the two-part recovery process can utilize the first communication interface and a second part of the two-part recovery process can utilize the second communication interface. The first part of the two-part recovery process can comprise downloading, to the device, through the first communication interface, a first firmware image for the device. The first firmware image can comprise firmware to execute the second part of the two-part recovery process utilizing the second communication protocol and the second communication bus. The second part of the two-part recovery process can comprise downloading, to the device, through the second communication interface, a second firmware image for the device. The first firmware image and the second firmware image together can allow the device to operate in a recovery state. The two-part recovery process can be conducted, for example, according to the Open Compute Project (OCP) specification.

According to another embodiment, a device can comprise a first communication interface which, when coupled with a first communication bus, provides for communication on the first communication bus utilizing a first communication protocol and a second communication interface which, when coupled with a second communication bus, provides for communication on the second communication bus utilizing a second communication protocol. The second communication bus can transfer data at a higher rate than the first communication bus. For example, the first communication interface can comprise a SMBus interface and the second communication interface can comprise a PCIe bus interface or a USB bus interface. The second communication protocol can comprise, for example, MCTP.

The device can comprise a control circuit controlling operations of the device, wherein, upon start up of the device, the control circuit of the device can cause the device to perform a two-part recovery process. The Read-Only Memory (ROM) can include support for the first stage while code downloaded in the first stage supports the second stage. The first part of the two-part recovery process can utilize the first communication interface and the second part of the two-part recovery process can utilize the second communication interface. The first part of the two-part recovery process can comprise downloading, through the first communication interface, from a BMC coupled with the first communication bus and the second communication bus, a first firmware image for the device. The first firmware image can comprise firmware to execute the second part of the two-part recovery process utilizing the second communication protocol and the second communication bus. The second part of the two-part recovery process can comprise downloading, from the BMC, through the second communication interface, a second firmware image for the device. The first firmware image and the second firmware image together can allow the device to operate in a recovery state. The two-part recovery process can be conducted, for example, according to the Open Compute Project (OCP) specification.

According to yet another embodiment, a system can comprise a first communication bus utilizing a first communication protocol and a second communication bus utilizing a second communication protocol. The second communication bus can transfer data at a higher rate than the first communication bus. For example, the first communication bus can comprise a SMBus and the second communication bus can comprises a PCIe bus or a USB bus. The second communication protocol can comprise, for example, MCTP.

The system can further comprise a BMC coupled with the first communication bus and the second communication bus. The BMC can comprise a control circuit controlling operation of the BMC. The system can further comprise a device coupled with the first communication bus and the second communication bus. The device can comprise a control circuit controlling operation of the device.

Upon startup of the device, the control circuit of the BMC and the control circuit of the device can cause the BMC and the device to perform a two-part recovery process. A first part of the two-part recovery process can utilize the first communication bus and a second part of the two-part recovery process can utilize the second communication bus. The first part of the two-part recovery process can comprise downloading, from the BMC, to the device, a first firmware image for the device. The first firmware image can comprise firmware which, when executed by the control circuit of the device, can cause the device to execute the second part of the two-part recovery process utilizing the second communication protocol and the second communication bus. The second part of the two-part recovery process can comprise downloading, from the BMC, to the device, a second firmware image for the device. The first firmware image and the second firmware image together can allow the device to operate in a recovery state. The two-part recovery process can be conducted, for example, according to the OCP specification.

Additional features and advantages are described herein and will be apparent from the following Detailed Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
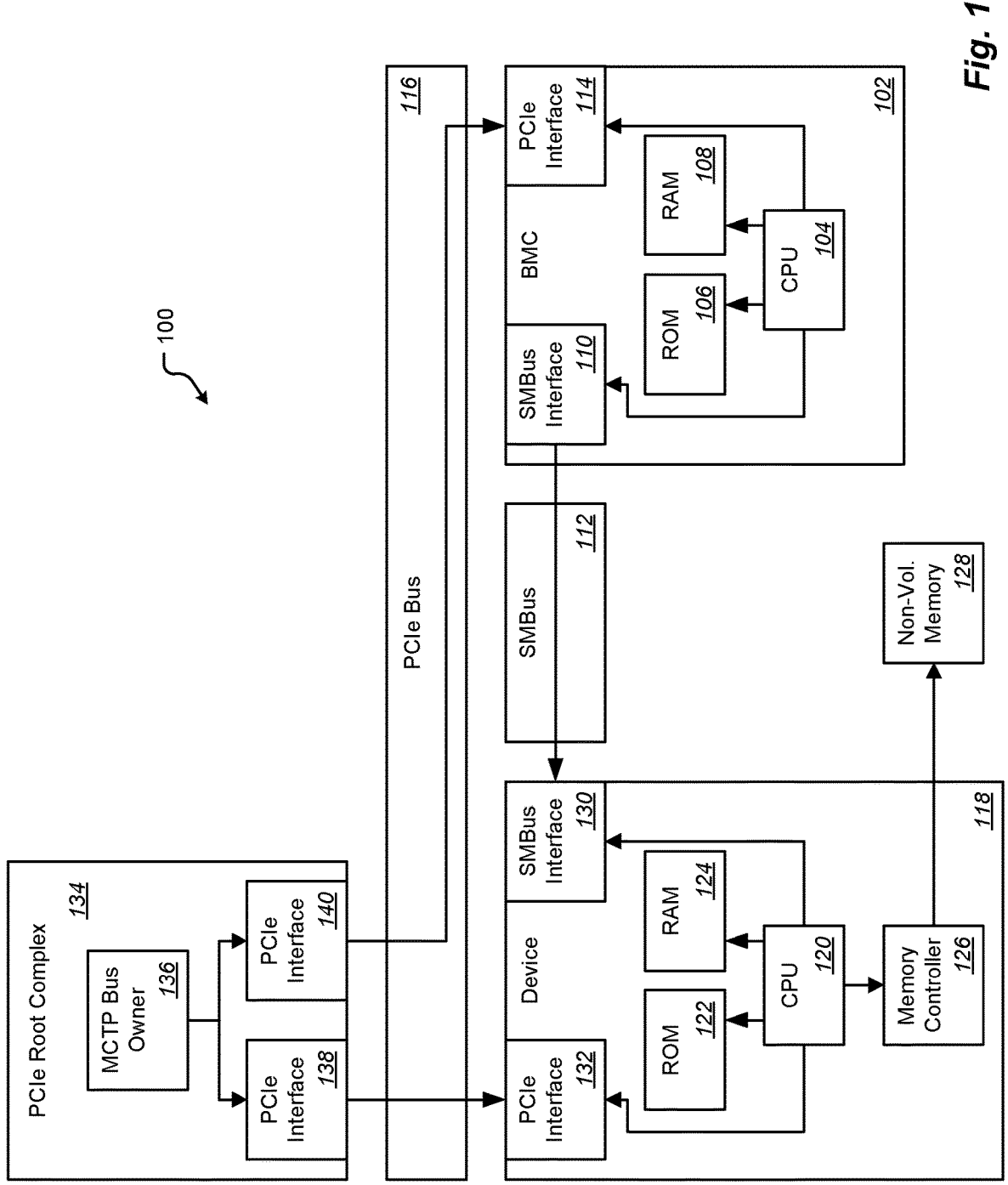
FIG. 1 is a block diagram illustrating an exemplary environment in which embodiments of the present disclosure can be implemented.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not to be deemed "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-5, various systems and methods for efficient processes for recovering a hardware device in a computing system will be described. More specifically, embodiments of the present disclosure are directed to a two-part device recovery process. In a first part of the two-part process, an initial firmware image can be provided to the recovery device over a first, slower communication bus of the computing system. This initial image can provide the core for the device to communicate using a second, faster communications by of the computing system. A second part of the two-part process can then take place utilizing the second, faster communication bus. As a result, the programming operation which requires a larger data transfer can happen over the faster bus which addresses the need for short recovery time.

FIG. 1 is a block diagram illustrating an exemplary environment in which embodiments of the present disclosure can be implemented. As illustrated in this example, the environment 100 can comprise a Baseboard Management Controller (BMC) 102. Generally speaking, a BMC 102 is a service processor which is capable of monitoring the physical and logical state of servers, computers, or other hardware devices and is typically embedded within the main circuit board or motherboard of the device or computer system to be monitored. The BMC 102 can comprise a control circuit 104. As shown where, the control circuit 104 can comprise a Central Processing Unit (CPU), e.g., one or more microprocessors, as known in the art. The BMC 102 can also comprise Random Access Memory (RAM) 108 and Read Only Memory (ROM) 106 storing executable code and data used by the control circuit 104 to control operation of the BMC 102.

The BMC 102 can also comprise a first communication interface 110 which, when coupled with a first communication bus 112, provides for communication on the first communication bus 112 utilizing a first communication protocol and a second communication interface 114 which, when coupled with a second communication bus 116, provides for communication on the second communications 116 bus utilizing a second communication protocol. The second communication bus 116 can transfer data at a higher rate than the first communication bus 112. For example, the first communication interface 110 can comprise a System Management Bus (SMBus) interface 110 to an SMBus 112 for the environment 100 and the second communication interface 114 can comprise a Peripheral Component Interconnect express (PCIe) bus interface 114 to a PCIe bus 116. The second communication protocol can comprise, for example, a Management Component Transport Protocol (MCTP). It should be noted that other, fast bus, i.e., faster than the SMBus 112 can be used for the second bus 116. For example, the second interface 114 can comprise a Universal Serial Bus (USB) bus interface to a USB bus.

The environment 100 can further comprise a device 118, i.e., a device to be recovered. The device 118 can comprise control circuit 120. As shown where, the control circuit 104 can comprise a Central Processing Unit (CPU), e.g., one or more microprocessors, as known in the art. The device 118 can also comprise RAM 124 and ROM 122 storing executable code and data used by the control circuit 120 to control operation of the device 118. The device 118 can also include a memory controller 126 for accessing and controlling external non-volatile memory 128. The device can also comprise a first communication interface 130, e.g., an SMBus interface, coupled with the first communication bus 112 and a second communication interface 132, e.g., a PCIe interface, USB interface, etc., coupled with the second communication bus 116.

The environment 100 can further comprise a root complex device 134 such as a PCIe root complex device, for example. Generally speaking, the root complex device 134 can generate transaction requests on behalf of devices which are interconnected through a local bus, such as the second communication bus 116. Additionally, or alternatively, the root complex device 134 can allow the devices 102 and 118 to communicate directly through the root complex device interfaces 140 and 138. Accordingly, the root complex device 134 can comprise a plurality of communication interfaces 138 and 140 coupled with the second communication bus 116. The root complex device 134 can further comprise a bus owner 136 such as a Management Component Transport Protocol (MCTP) bus owner, for example. Generally speaking, and as known in the art, a bus owner 136 can operate to assign identifiers and/or addresses to devices using the communication bus(es) it manages.

According to one embodiment of the present disclosure, upon detecting startup of the device 118 coupled with the first communication bus 112 and the second communication bus 116, the control circuit 104 of the BMC 102 can cause the BMC 102 to perform a two-part recovery process with the device 118. A first part of the two-part recovery process can utilize the first communication interfaces 110 and 130 and first communication bus 112 and a second part of the two-part recovery process can utilize the second communication interfaces 114 and 132 and the second communication bus 116 and the PCIe root complex 134 and/or a PCIe switch (not shown) where applicable. The first part of the two-part recovery process can comprise downloading, to the device 118, a first firmware image for the device. The first firmware image can comprise firmware to execute the second part of the two-part recovery process utilizing the second communication protocol, e.g., MCTP, and the second communication bus 116. The second part of the two-part recovery process can comprise downloading, to the device 118 a second firmware image for the device 118. The first firmware image and the second firmware image together can allow the device to operate in a recovery state. The two-part recovery process can be conducted, for example, according to the Open Compute Project (OCP) specification.

More specifically, an initial recovery image can be injected to the device 118 using the SMBus 112 similar to the definitions in the OCP recovery specification. Once the injected image starts running it allows not only the advanced protocols, such as Platform Level Data Model (PLDM) for Firmware (FW) Update as defined in OCP recovery specification, but it also allows the device 118 to use the advanced protocols over a faster medium second communications bus 116 such as PCIe, for example.

Once the advanced protocol is supported, the device 118 can issue a discovery notification such as a "Discovery Notify" MCTP message, for example, to the MCTP bus owner 136 over the second communication bus 116.

When the MCTP bus owner 136 receives this message, it can perform enumeration to the device 118 which can assign an Endpoint IDentifier (EID) to the device 118.

Upon enumeration, the device 118 can expose to the BMC 102 it was enumerated on the faster, second communication bus 116. In some cases, the BMC 102 may detect this already via its connection to the MCTP bus owner 136.

The BMC 102 can then perform "Medium migration" over the second communication bus 116, e.g., using MCTP transport over the PCIe bus, to perform the programming operation of the recovered device 118, e.g., using PLDM for FW update over MCTP over PCIe. Note that given that the recovered device 118 is still in its recovery state, it may only expose a low-speed link, e.g., PCIe Gen1, which can still be fast enough for recovery but may not be fast enough for full functionality.

When the device 118 programming concludes it can notify the BMC 102 that a device reset should be performed to activate of the programmed image, as was added into PLDM for FW update starting from version 1.3.

The BMC 102 can then, in response to the reset request, reset the whole environment 100 which will reset the device 118 and the second communication bus 116, e.g., PCIe bus. Upon reset, the device 118 can be detected and enumerated by the MCTP bus owner 136 in functional mode, and it can the be ready for operation in a recovery state.

As a result of these processes, the programming operation which requires a large data transfer, e.g., tens of MB of data or more, can happen over the faster, second communication bus 116, e.g., PCIe, rather than the slower, first communication bus, e.g., SMBus, which can provide a shorter recovery time. As a reference, transferring 10 MB of FW Image using PLDM for FW Update over 100 Kbps SMBus will require at least 10 minutes while passing the same over PCIe Gen1×1 will only require about 0.1 sec with the same protocol overhead assumptions.

Figure 2:
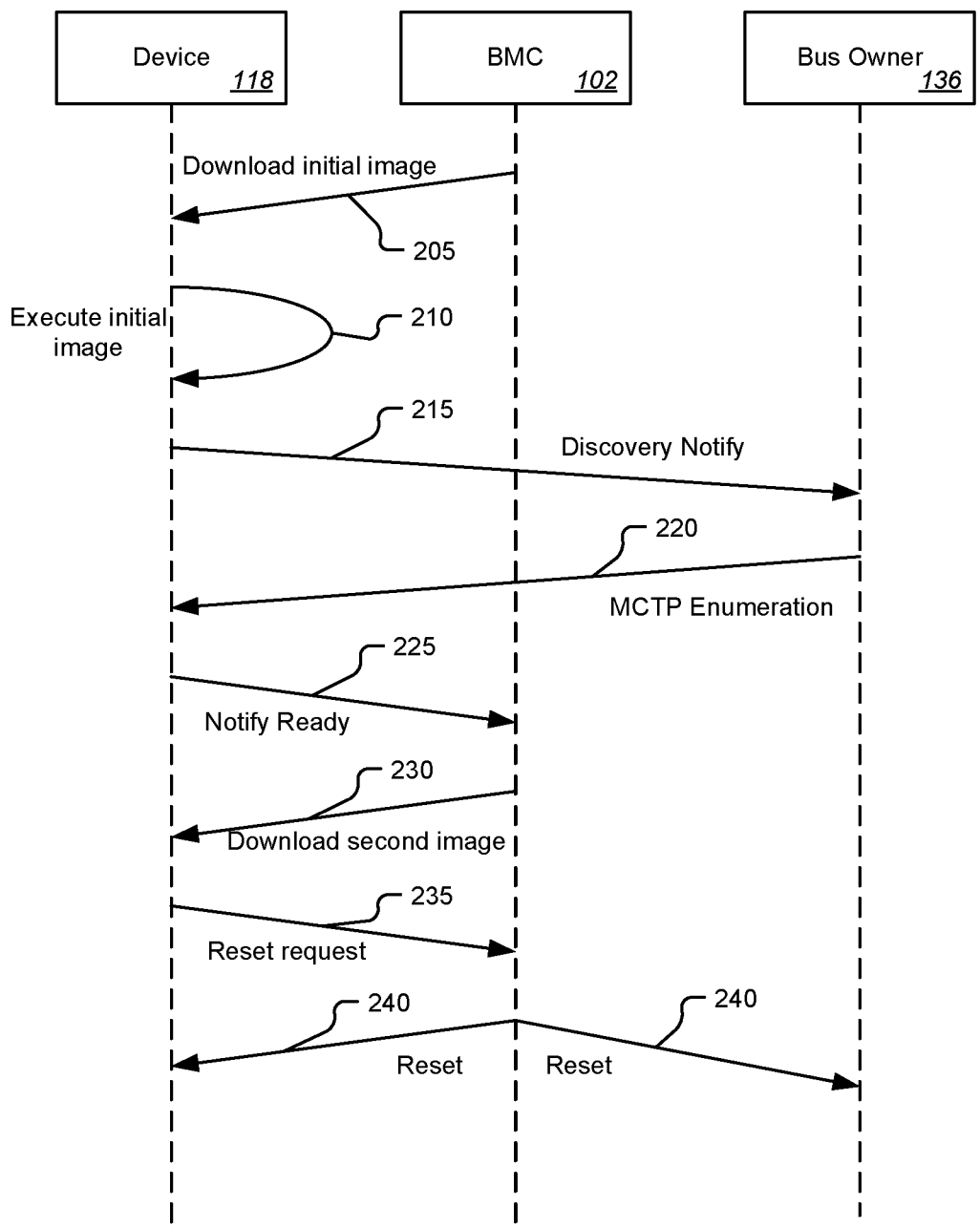
FIG. 2 is a diagram illustrating an exemplary process for device recovery according to one embodiment of the present disclosure.

FIG. 2 is a diagram illustrating an exemplary process for device recovery according to one embodiment of the present disclosure. As noted, upon detecting startup of the device 118, the BMC 102 performs a two-part recovery process. The first part of the two-part recovery process can comprise downloading 205, to the device 118, through the first communication interface, e.g., SMBus interface 110 and SMBus 112, a first firmware image for the device 118. The first firmware image can comprise firmware to execute the second part of the two-part recovery process utilizing the second communication protocol and the second communication bus, e.g., MCTP and the PCIe bus 116.

The device 118 can then execute 210 the first firmware image and send 215, e.g., via PCIe interface 130 and PCIe bus 116, a discovery notification to a bus owner 136 of the PCIe bus 116.

The bus owner 136 can receive from the device 118, e.g., via PCIe interface 138 and PCIe bus 116, the discovery notification. In response, the bus owner 136 can provide 220 an MCTP enumeration to the device 118, e.g., via PCIe interface 138 and PCIe bus 116.

In response, the device 118 can receive from the bus owner 136 an MCTP enumeration and send 225 a ready notification to the BMC 102.

The BMC 102 can receive the ready notification from the device 118. In response, the BMC 102 can initiate the second part of the two-part recovery process which can comprise downloading 230, to the device 118, through the second communication interface, e.g., PCIe interface 114 and PCIe bus 116, a second firmware image for the device 118. The first firmware image and the second firmware image together can allow the device to operate in a recovery state.

Once the download of the second firmware image is complete, the device 118 can send 235 a reset request to the BMC 102.

The BMC 102 can receive a request for reset from the device 118. In response, the BMC 102 can send 240 a reset message to the device 118 and bus owner 136.

Figure 3:
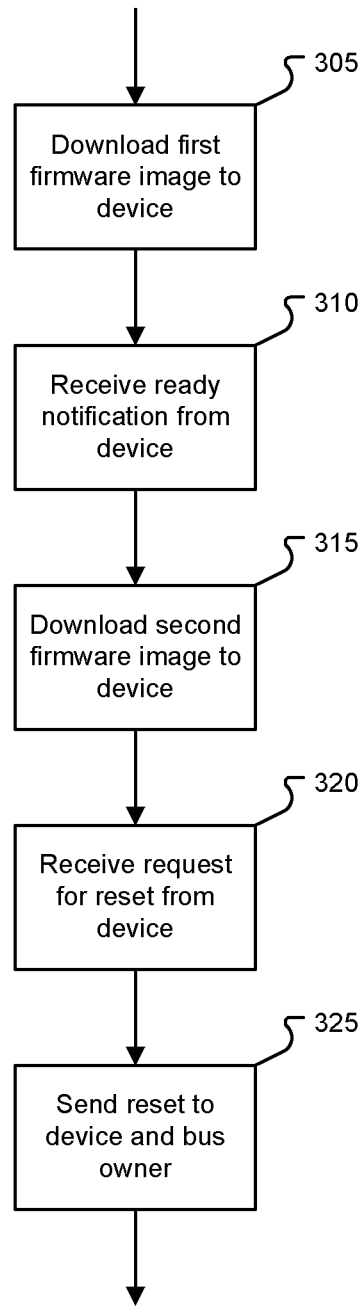
FIG. 3 is a flowchart illustrating an exemplary process for device recovery according to one embodiment of the present disclosure.

FIG. 3 is a flowchart illustrating an exemplary process for device recovery according to one embodiment of the present disclosure. More specifically, this example illustrates processes as can be performed by a BMC 102 as described above. As noted, upon detecting startup of the device 118, the BMC 102 to perform a two-part recovery process. The first part of the two-part recovery process can comprise downloading 305, to the device 118, through the first communication interface, e.g., SMBus interface 110 and SMBus 112, a first firmware image for the device 118. The first firmware image can comprise firmware to execute the second part of the two-part recovery process utilizing the second communication protocol and the second communication bus, e.g., MCTP and the PCIe bus 116.

The BMC 102 can receive 310 a ready notification from the device 118 once the device 118 has executed the first firmware image. In response, the BMC 102 can initiate the second part of the two-part recovery process which can comprise downloading 315, to the device 118, through the second communication interface, e.g., PCIe interface 114 and PCIe bus 116, a second firmware image for the device 118. The first firmware image and the second firmware image together can allow the device to operate in a recovery state. Once the device 118 has received and installed the second firmware image, the BMC 102 can receive 320 a request for reset from the device 118. In response, the BMC 102 can send 325 a reset message to the device 118 and bus owner 136.

Figure 4:
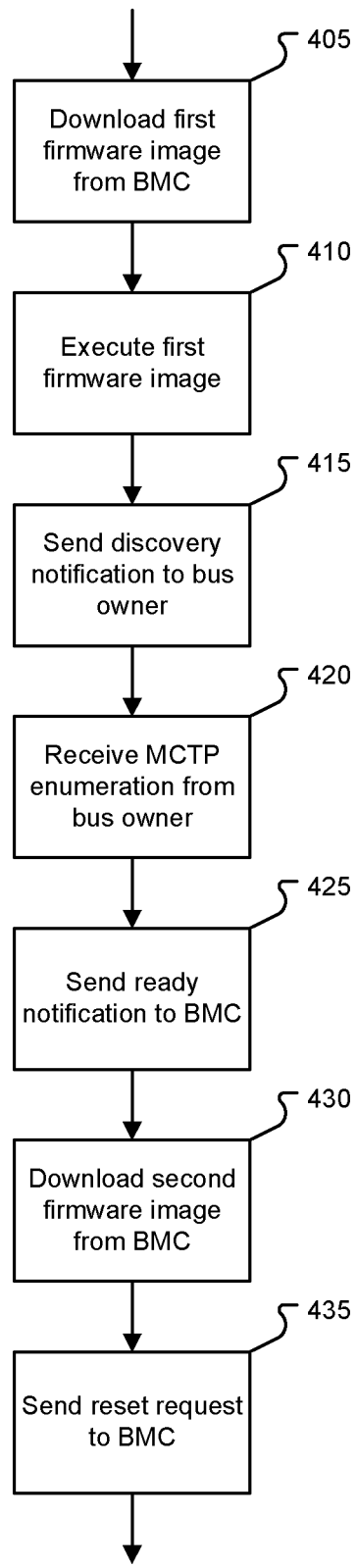
FIG. 4 is a flowchart illustrating an exemplary process for device recovery according to another embodiment of the present disclosure.

FIG. 4 is a flowchart illustrating an exemplary process for device recovery according to another embodiment of the present disclosure. More specifically, this example illustrates processes as may be performed by the device 118 to be recovered as described above. As noted, upon start up of the device 118, the device can perform a two-part recovery process. The first part of the two-part recovery process can comprise downloading 405, through the first communication interface, e.g., SMBus interface 110 and SMBus 112, from a BMC 102, a first firmware image for the device 118. The first firmware image can comprise firmware to execute the second part of the two-part recovery process.

The device 118 can then execute 410 the first firmware image and send 415, e.g., via PCIe interface 132 and PCIe bus 116, a discovery notification to a bus owner 136 of the PCIe bus 116. In response, the device 118 can receive 420 from the bus owner 136 an MCTP enumeration and send 425 a ready notification to the BMC 102.

The device 118 can then perform the second part of the two-part recovery process by downloading 430, from the BMC 102, e.g., via PCIe interface 132 and PCIe bus 116, a second firmware image for the device. The first firmware image and the second firmware image together can allow the device to operate in a recovery state. Once the download of the second firmware image is complete, the device 118 can send 435 a reset request to the BMC 102.

Figure 5:
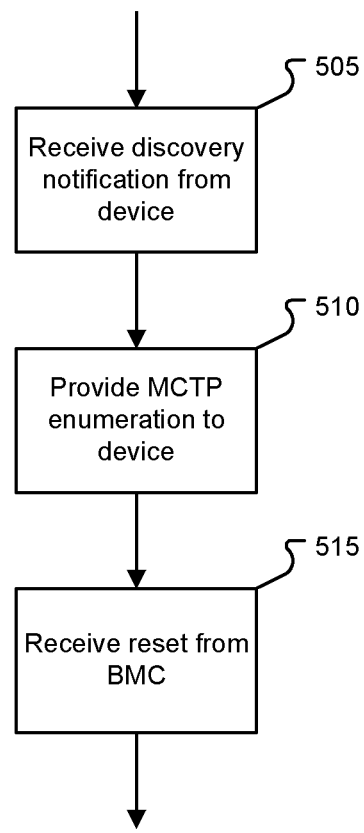
FIG. 5 is a flowchart illustrating an exemplary process for device reset according to another embodiment of the present disclosure.

FIG. 5 is a flowchart illustrating an exemplary process for device reset according to another embodiment of the present disclosure. More specifically, this example illustrates processes as may be performed by a bus owner 136 as described above. As illustrated herein, after the device has executed the first firmware image from the BMC 102, the bus owner 136 can receive 505 from the device 118, e.g., via PCIe interface 138 and PCIe bus 116, a discovery notification. In response, the bus owner 136 can provide 510 an MCTP enumeration to the device 118, e.g., via PCIe interface 138 and PCIe bus 116. After the device 118 has installed the second firmware image, the bus owner 136 can receive 515 a reset message from the BCM 102.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art. It is to be appreciated that any feature described herein can be claimed in combination with any other feature (s) as described herein, regardless of whether the features come from the same described embodiment.

What is claimed is:
1. A Baseboard Management Controller (BMC) comprising:

a first communication interface which, when coupled with a first communication bus, provides for communication on the first communication bus utilizing a first communication protocol;
a second communication interface which, when coupled with a second communication bus, provides for communication on the second communication bus utilizing a second communication protocol, wherein the second communication bus transfers data at a higher rate than the first communication bus; and
a control circuit controlling operations of the BMC, wherein, upon detecting startup of a device coupled with the first communication bus and the second communication bus, the control circuit of the BMC causes the BMC to perform a two-part recovery process, wherein a first part of the two-part recovery process utilizes the first communication interface and a second part of the two-part recovery process utilizes the second communication interface.

2. The BMC of claim 1, wherein the first part of the two-part recovery process comprises downloading, to the device, through the first communication interface, a first firmware image for the device, wherein the first firmware image comprises firmware to execute the second part of the two-part recovery process utilizing the second communication protocol and the second communication bus.

3. The BMC of claim 2, wherein the second part of the two-part recovery process comprises downloading, to the device, through the second communication interface, a second firmware image for the device, wherein the first firmware image and the second firmware image together allow the device to operate in a recovery state.

4. The BMC of claim 1, wherein the two-part recovery process is conducted according to an Open Compute Project (OCP) specification.

5. The BMC of claim 1, wherein the first communication interface comprises a System Management Bus (SMBus) interface.

6. The BMC of claim 5, wherein the second communication interface comprises a Peripheral Component Interconnect express (PCIe) bus interface or a Universal Serial Bus (USB) bus interface.

7. The BMC of claim 6, wherein the second communication protocol comprises a Management Component Transport Protocol (MCTP).

8. A device comprising:
a first communication interface which, when coupled with a first communication bus, provides for communication on the first communication bus utilizing a first communication protocol;
a second communication interface which, when coupled with a second communication bus, provides for communication on the second communication bus utilizing a second communication protocol, wherein the second communication bus transfers data at a higher rate than the first communication bus; and
a control circuit controlling operations of the device, wherein, upon start up of the device, the control circuit of the device causes the device to perform a two-part recovery process, wherein a first part of the two-part recovery process utilizes the first communication interface and a second part of the two-part recovery process utilizes the second communication interface.

9. The device of claim 8, wherein the first part of the two-part recovery process comprises downloading, through the first communication interface, from a Baseboard Management Controller (BMC) coupled with the first communication bus and the second communication bus, a first firmware image for the device, wherein the first firmware image comprises firmware to execute the second part of the two-part recovery process utilizing the second communication protocol and the second communication bus.

10. The device of claim 9, wherein the second part of the two-part recovery process comprises downloading, from the BMC, through the second communication interface, a second firmware image for the device, wherein the first firmware image and the second firmware image together allow the device to operate in a recovery state.

11. The device of claim 8, wherein the two-part recovery process is conducted according to an Open Compute Project (OCP) specification.

12. The device of claim 8, wherein the first communication interface comprises a System Management Bus (SMBus) interface.

13. The device of claim 12, wherein the second communication interface comprises a Peripheral Component Interconnect express (PCIe) bus interface or a Universal Serial Bus (USB) bus interface.

14. The device of claim 13, wherein the second communication protocol comprises a Management Component Transport Protocol (MCTP).

15. A system comprising:
a first communication bus utilizing a first communication protocol;
a second communication bus utilizing a second communication protocol, wherein the second communication bus transfers data at a higher rate than the first communication bus;
a Baseboard Management Controller (BMC) coupled with the first communication bus and the second communication bus, the BMC comprising a control circuit controlling operation of the BMC; and
a device coupled with the first communication bus and the second communication bus, the device comprising a control circuit controlling operation of the device, wherein, upon startup of the device, the control circuit of the BMC and the control circuit of the device cause the BMC and the device to perform a two-part recovery process, wherein a first part of the two-part recovery process utilizes the first communication bus and a second part of the two-part recovery process utilizes the second communication bus.

16. The system of claim 15, wherein the first part of the two-part recovery process comprises downloading, from the BMC, to the device, a first firmware image for the device, wherein the first firmware image comprises firmware which, when executed by the control circuit of the device, causes the device to execute the second part of the two-part recovery process utilizing the second communication protocol and the second communication bus.

17. The system of claim 16, wherein the second part of the two-part recovery process comprises downloading, from the BMC, to the device, a second firmware image for the device, wherein the first firmware image and the second firmware image together allow the device to operate in a recovery state.

18. The system of claim 15, wherein the two-part recovery process is conducted according to an Open Compute Project (OCP) specification.

19. The system of claim 15, wherein the first communication bus comprises a System Management Bus (SMBus).

20. The system of claim 19, wherein the second communication bus comprises a Peripheral Component Interconnect express (PCIe) bus or a Universal Serial Bus (USB) bus and wherein the second communication protocol comprises a Management Component Transport Protocol (MCTP).

\* \* \* \* \*